United States Patent
Gasser et al.

(10) Patent No.: US 10,277,410 B2
(45) Date of Patent: Apr. 30, 2019

(54) USE OF A BUS LINE TO TRANSMIT ALTERNATIVE SIGNAL CODING

(71) Applicant: Bayerische Motoren Werke Aktiengesellschaft, Munich (DE)

(72) Inventors: Bernhard Gasser, Munich (DE); Peter Winklhofer, Munich (DE); Martin Kaltenbrunner, Taufkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 220 days.

(21) Appl. No.: 15/484,700

(22) Filed: Apr. 11, 2017

(65) Prior Publication Data

US 2017/0222818 A1  Aug. 3, 2017

Related U.S. Application Data

(63) Continuation of application No. PCT/EP2015/072245, filed on Sep. 28, 2015.

(30) Foreign Application Priority Data

Oct. 13, 2014 (DE) .................. 10 2014 220 646

(51) Int. Cl.
*H04L 12/12* (2006.01)
*H04L 12/40* (2006.01)
(Continued)

(52) U.S. Cl.
CPC ............ *H04L 12/12* (2013.01); *H04L 12/403* (2013.01); *H04L 12/40039* (2013.01);
(Continued)

(58) Field of Classification Search
None
See application file for complete search history.

(56) References Cited

U.S. PATENT DOCUMENTS

| 3,936,614 A | 2/1976 | Suntop |
| 7,661,504 B2 * | 2/2010 | Odate .................. B60R 22/44 |
| | | 180/270 |

(Continued)

FOREIGN PATENT DOCUMENTS

| DE | 197 58 273 A1 | 7/1999 |
| DE | 100 11 409 A1 | 9/2001 |

(Continued)

OTHER PUBLICATIONS

International Search Report (PCT/ISA/210) issued in PCT Application No. PCT/EP2015/072245 dated Dec. 3, 2015 with English translation (five pages).

(Continued)

*Primary Examiner* — Andrew C Oh
(74) *Attorney, Agent, or Firm* — Crowell & Moring LLP

(57) ABSTRACT

A vehicle module for a vehicle includes one or more sensors, which are configured to record sensor data in an operating mode of the vehicle module, and are configured to adopt a plurality of discrete states in an energy saving mode in order to provide a basic function of the vehicle module in the energy saving mode of the vehicle module. The vehicle module further has an interface for a data line to transmit the sensor data to a control device of the vehicle. In addition, the vehicle module has an energy saving mode switch which is configured to connect the one or more sensors in the energy saving mode to the interface for the data line in such a way that information regarding a state of the plurality of discrete states can be transmitted to the control device via the data line.

16 Claims, 1 Drawing Sheet

(51) Int. Cl.
*H04L 12/403* (2006.01)
*H04Q 9/00* (2006.01)

(52) U.S. Cl.
CPC ........ *H04L 12/40045* (2013.01); *H04Q 9/00* (2013.01); *H04L 2012/40234* (2013.01); *H04L 2012/40273* (2013.01); *H04Q 2209/883* (2013.01); *Y02D 50/40* (2018.01)

(56) References Cited

U.S. PATENT DOCUMENTS

| | | | | |
|---|---|---|---|---|
| 7,715,928 B1* | 5/2010 | Ciancio | ............... | H04L 67/12 348/88 |
| 2001/0013826 A1* | 8/2001 | Ahmed | ............... | G01D 11/24 340/439 |
| 2003/0065556 A1* | 4/2003 | Takanashi | ............... | G08G 1/202 705/13 |
| 2004/0054503 A1* | 3/2004 | Namaky | ............... | G01R 31/007 702/183 |
| 2004/0148083 A1* | 7/2004 | Arakawa | ............... | G07C 5/008 701/50 |
| 2005/0080527 A1* | 4/2005 | Tao | ............... | F16H 59/38 701/31.1 |
| 2005/0228546 A1* | 10/2005 | Naik | ............... | B60T 8/885 701/1 |
| 2005/0275528 A1* | 12/2005 | Kates | ............... | G08B 1/08 340/539.22 |
| 2006/0064291 A1* | 3/2006 | Pattipatti | ............... | G05B 23/0251 703/14 |
| 2006/0129308 A1* | 6/2006 | Kates | ............... | A61H 3/061 701/532 |
| 2008/0112885 A1* | 5/2008 | Okunev | ............... | A61B 1/00016 424/9.1 |
| 2008/0312511 A1* | 12/2008 | Osler | ............... | A61B 5/0008 600/300 |
| 2009/0058679 A1* | 3/2009 | Lauterbach | ............... | G08G 1/093 340/905 |
| 2009/0088910 A1* | 4/2009 | Yi | ............... | H04L 12/12 701/1 |
| 2010/0117788 A1* | 5/2010 | Link | ............... | H04L 12/4035 340/5.1 |
| 2010/0121534 A1* | 5/2010 | Tanaka | ............... | H04L 12/40039 701/45 |
| 2010/0253567 A1* | 10/2010 | Factor | ............... | G01S 7/36 342/52 |
| 2010/0321171 A1* | 12/2010 | Battista | ............... | G01S 5/0018 340/425.5 |
| 2011/0202289 A1* | 8/2011 | Kalantari Khandani | ............... | G01M 5/0008 702/42 |
| 2012/0236827 A1* | 9/2012 | Izawa | ............... | H04W 36/0005 370/331 |
| 2012/0270505 A1* | 10/2012 | Prakash | ............... | H04L 69/26 455/66.1 |
| 2012/0271579 A1* | 10/2012 | Deokar | ............... | G01R 19/2513 702/64 |
| 2013/0079992 A1* | 3/2013 | Nakajima | ............... | B62D 5/065 701/42 |
| 2013/0151067 A1* | 6/2013 | Lammers | ............... | B60C 23/008 701/36 |
| 2013/0250845 A1* | 9/2013 | Greene | ............... | H04Q 9/00 370/315 |
| 2014/0047255 A1* | 2/2014 | Sasaki | ............... | G06F 1/3234 713/323 |
| 2014/0143575 A1* | 5/2014 | Ansley | ............... | H04W 52/0235 713/323 |
| 2014/0163768 A1* | 6/2014 | Purdy | ............... | G08G 1/161 701/1 |
| 2014/0307650 A1* | 10/2014 | Vermani | ............... | H04L 5/0044 370/329 |
| 2015/0035375 A1* | 2/2015 | Mayer | ............... | B60T 17/22 307/104 |
| 2015/0036670 A1* | 2/2015 | Park | ............... | H04W 52/0225 370/338 |
| 2015/0043411 A1* | 2/2015 | Kim | ............... | H04W 4/70 370/311 |
| 2015/0094929 A1* | 4/2015 | Bell | ............... | G07C 5/008 701/99 |
| 2015/0139051 A1* | 5/2015 | Gonia | ............... | H04W 52/0229 370/311 |
| 2015/0149110 A1* | 5/2015 | Shin | ............... | B60C 23/0457 702/130 |
| 2015/0168928 A1* | 6/2015 | Graff | ............... | G05B 15/02 700/23 |
| 2015/0378356 A1* | 12/2015 | Hefeeda | ............... | G05B 19/0426 700/9 |
| 2016/0028824 A1* | 1/2016 | Stenneth | ............... | B60Q 9/008 709/219 |
| 2016/0127473 A1* | 5/2016 | Khan | ............... | H04L 67/12 455/66.1 |
| 2016/0157979 A1* | 6/2016 | Dinger | ............... | A01K 11/00 600/551 |
| 2016/0176382 A1* | 6/2016 | Siswick | ............... | B60R 25/2045 701/2 |
| 2016/0329745 A1* | 11/2016 | Linder | ............... | H02J 13/0062 |
| 2016/0355158 A1* | 12/2016 | Tombe | ............... | B60R 22/34 |
| 2017/0052052 A1* | 2/2017 | Gwon | ............... | B65F 1/14 |

FOREIGN PATENT DOCUMENTS

| | | |
|---|---|---|
| DE | 10 2009 027 593 A1 | 1/2011 |
| DE | 10 2010 040 785 A1 | 3/2012 |
| DE | 10 2013 203 731 A1 | 9/2014 |
| WO | WO 2005/024749 A2 | 3/2005 |
| WO | WO-2015185131 A1 * | 12/2015 ........ H04W 52/0216 |

OTHER PUBLICATIONS

German-language Written Opinion (PCT/ISA/237) issued in PCT Application No. PCT/EP2015/072245 dated Dec. 3, 2015 (six pages).

German Search Report issued in counterpart German Application No. 10 2014 220 646.4 dated Oct. 6, 2015 with partial English translation (14 pages).

* cited by examiner

USE OF A BUS LINE TO TRANSMIT ALTERNATIVE SIGNAL CODING

CROSS REFERENCE TO RELATED APPLICATIONS

This application is a continuation of PCT International Application No. PCT/EP2015/072245, filed Sep. 28, 2015, which claims priority under 35 U.S.C. §119 from German Patent Application No. 10 2014 220 646.4, filed Oct. 13, 2014, the entire disclosures of which are herein expressly incorporated by reference.

BACKGROUND AND SUMMARY OF THE INVENTION

The invention relates to an apparatus for coupling a vehicle module, in particular a vehicle sensor, to a control device. The invention relates, in particular, to a vehicle module comprising an interface for a data line for transmitting the sensor data to a control device of the vehicle.

Vehicle modules, for example vehicle sensors, of a vehicle can be connected to a control device, for example to a central control device or ECU (Electronic Control Unit) of the vehicle by means of single-wire data transmission systems, for example by means of an LIN (Local Interconnect Network) bus. Owing to an "error-switchable energy supply line" or error line, which is at a high potential level in a normal case, for example in an operating mode of the vehicle module, individual vehicle modules can be deactivated in the event of an error, in particular in the case of a fault in the energy supply. The "error-switchable energy supply line" (error line) can be used, for example, to supply energy to the vehicle modules. When the vehicle modules are deactivated, vehicle sensors in particular can be disconnected from the overall system, so that it is no longer possible to actuate, to address and/or to read these vehicle sensors.

The deactivation of the "error-switchable energy supply line" typically leads to a reduction in the vehicle module current. The "error-switchable energy supply line" (or error line) can therefore be used to deactivate vehicle modules in order to reduce energy consumption by the vehicle.

The present document concerns the technical problem of providing a vehicle module which can provide one or more fundamental basic functions in an efficient manner even in an energy saving mode and/or in the event of an error, that is to say in particular in the case of an interrupted energy supply.

The problem is solved by a vehicle module as well as a control device in accordance with embodiments of the invention.

One aspect describes a vehicle module for a vehicle (in particular for a road vehicle). The vehicle module comprises one or more sensors which are configured to record sensor data in an operating mode of the vehicle module and which are configured to adopt a large number of discrete states in an energy saving mode of the vehicle module in order to provide a basic function of the vehicle module in the energy saving mode.

The one or more sensors can comprise a first sensor which is designed to record sensor data in the operating mode of the vehicle module. The first sensor can be, for example, a sensor on a door handle of the vehicle, on a door of the vehicle, on a tailgate of the vehicle and/or on a fuel filler flap of the vehicle. By way of example, the first sensor can be a proximity sensor which is designed to detect a hand of a user approaching the vehicle.

The one or more sensors can further comprise a basic sensor which is designed to adopt the large number of discrete states in order to provide the basic function of the vehicle module in the energy saving mode of the vehicle module. In particular, the basic sensor can be designed to provide data for a vehicle function to a limited extent if no sensor data can be provided by way of the first sensor for the vehicle function (because the vehicle module is in the energy saving mode). By way of example, the basic sensor can provide information about whether an (optionally mechanical or electronic) basic switch has been operated or not (for example by a hand of a user of the vehicle). Therefore, although approach (for example a door handle being approached) cannot be detected by the basic sensor, at least a specific operation (for example grasping of the door handle) can be detected.

The one or more sensors can comprise a large number of sensors. By way of example, one sensor on the rear side of the door handle, one sensor on the front side of the door handle and one proximity sensor can be arranged on a door of the vehicle. In the operating mode, all of the sensors of the large number of sensors can be active and record sensor data. Therefore, a function can be provided with a high level of convenience. Secondly, only some of the large number of sensors can be active in the energy saving mode, in order to provide the basic function. By way of example, only the sensor on the rear side of the door handle can be active in the energy saving mode. Furthermore, instead of the (optionally coded) sensor data, discrete states (such as, for example, contact is made with the sensor or contact is not made with the sensor) can be generated in the energy saving mode.

In other words, the large number of sensors can include the abovementioned first sensor and the basic sensor. In this case, the basic sensor can optionally be active in the operating mode too, in order to provide a complete function of the vehicle module. By way of example, the basic sensor can be the sensor on the rear side of the door handle.

In the operating mode, the one or more sensors can provide sensor data which is coded in accordance with a predefined transmission method. On the other hand, the one or more sensors can provide discrete state information (for example switch open/switch closed) in the energy saving mode.

Furthermore, the vehicle module comprises an interface for a data line for transmitting the sensor data to a control device of the vehicle and/or for receiving data from the control device of the vehicle. By way of example, sensor data can be transmitted which indicates whether a hand of a user of the vehicle is approaching the first sensor. The data line between the vehicle module and the control device can be a single-wire data line, in particular a Local Interconnect Network (LIN) bus.

The vehicle module also comprises an energy saving mode switch which is designed to connect the one or more sensors to the interface for the data line in the energy saving mode in such a way that information relating to a state of the large number of discrete states can be transmitted to the control device by way of the data line. In particular, the energy saving mode switch can be designed to connect the basic sensor to the interface for the data line in the energy saving mode in order to transmit information relating to a state of the basic sensor to the control device by way of the data line.

Secondly, the energy saving mode switch can optionally ensure that the basic sensor is not connected to the interface for the data line in the operating mode or that no discrete state information but rather only (optionally coded) sensor data is applied to the data line in the operating mode. The energy saving mode switch therefore allows the available data line to be used for transmitting (direct) information relating to one state from amongst the large number of states (in particular relating to the state of the basic sensor) in the energy saving mode (in which the one or more sensors (in particular the first sensor) do not provide any sensor data). Therefore, the same data line can be used for transmitting the sensor data (in the operating mode) and for transmitting the discrete state information (in the energy saving mode). In other words, differently coded signals, that is to say sensor data (which is coded, for example, in accordance with a first format or a first transmission method) and information relating to one state from amongst the large number of discrete states can be transmitted by use of the same data line, in particular by use of the same bus line. In other words, it is possible for alternative signal codings to be transmitted by the same data line using the energy saving mode switch, in particular using a control circuit or control device of corresponding design. Therefore, a basic function of the vehicle module can be provided in an efficient manner (that is to say by using the same data line) even in the event of an error and/or in the case of operation with reduced energy consumption (that is to say in the energy saving mode).

As already outlined above, the basic sensor can be an (optionally mechanical) basic switch which can be operated by a user of the vehicle. The basic switch can have an open state and a closed state. In particular, the large number of discrete states can include (optionally exclusively) the open state and the closed state of the basic switch. The information relating to the open state can include a voltage level of the data line, which voltage level is greater than or equal to a voltage threshold value. Furthermore, the information relating to the closed state can include a voltage level of the data line, which voltage level is less than the voltage threshold value.

By way of example, the data line can be kept at a specific default voltage level (for example by a pull-up resistor to a supply voltage). The basic switch can be designed to couple the interface for the data line to a ground connection of the vehicle in the closed state. Therefore, the voltage level of the data line can correspond substantially to the default voltage level in the open state of the basic switch. Secondly, the voltage level of the data line can correspond substantially to the voltage level of the ground connection of the vehicle in the closed state of the basic switch. Therefore, the possible states of the basic sensor can be transmitted to the control device by two discrete voltage or potential levels of the data line. These different voltage levels can be detected by the control device.

The energy saving mode switch can comprise, for example, a normally on or normally off transistor (for example a metal oxide semiconductor (MOS) transistor) which has an on state and an off state. The transistor is designed to move from the off state to the on state when the vehicle module moves from the operating mode to the energy saving mode, and thereby to establish the connection between the basic sensor and the data line in the energy saving mode. Secondly, the off state (in the operating mode) ensures that the data line is occupied only by the sensor data from the first sensor and not by information relating to the state of the basic sensor in the operating mode.

The vehicle module can comprise a control unit which is designed to keep the (normally on or normally off) transistor in the off state when the vehicle module is in the operating mode (for example by applying an appropriate voltage to a gate of the transistor). Secondly, the normally on transistor can automatically switch over to the on state when the vehicle module is in the energy saving mode (for example when the control unit is no longer supplied with electrical energy). Therefore, reliable coupling of the basic sensor and data line can be ensured when moving to the energy saving mode.

The vehicle module can comprise an interface for a supply line. The supply line can also be called an error line or an energy saving mode line. The vehicle module can be supplied with electrical energy by means of the supply line. The electrical energy can be provided by an energy supply (for example by a battery) of the vehicle. The control device can be designed to interrupt the supply line to the vehicle module (for example in order to lower the energy consumption in the vehicle), and therefore to move the vehicle module to the energy saving mode. The vehicle module can be in the energy saving mode when the supply voltage at the interface for the supply line is less than or equal to a supply threshold value (for example when the supply voltage has fallen to substantially 0 V due to an interruption in the supply line). Therefore, the basic sensor can be used for providing a limited basic function when the supply voltage to the vehicle module is interrupted.

The vehicle module can be designed to draw electrical energy for supplying the one or more sensors (particularly for supplying the basic sensor) by way of the interface for the data line in the energy saving mode. This allows the use of electronic basic sensors.

The energy saving mode switch can be designed to automatically connect the basic sensor to the interface for the data line when the supply voltage at the interface for the supply line falls to or below the supply threshold value (for example when the supply line is interrupted). This can be achieved, for example, by using a (normally on or normally off) transistor circuit which automatically changes over to the on state when the supply voltage is interrupted. The channel of the transistor can be connected to the interface for the data line. Furthermore, the data line can be set at a specific default voltage level by a pull-up resistor, in order to provide a sufficient gate-source voltage $V_{GS}$ and in order to move the transistor to the on state.

One aspect describes a control device for a vehicle. The control device is designed to determine whether a vehicle module described in this document is in an operating mode or in an energy saving mode. In particular, the control device can determine whether a supply line to the vehicle module has been interrupted or not, and whether the vehicle module is therefore in the energy saving mode or in the operating mode.

As outlined above, the vehicle module includes one or more sensors which are designed to transmit sensor data by way of a data line in the operating mode, and to transmit discrete state information by way of the data line in the energy saving mode. The one or more sensors can comprise a first sensor and a basic sensor. The first sensor is typically designed to provide relatively extensive or relatively convenient sensor data relating to a vehicle function (for example a function for opening a vehicle door or a vehicle flap). The basic sensor is typically designed to assume a large number of discrete states, and therefore to provide limited basic information relating to the vehicle function (for example in order to be able to provide the vehicle function with a reduced level of convenience). The basic sensor can optionally also be active in the operating mode, and provide some of the sensor data.

The control device is further designed to receive information from the vehicle module by way of a data line (in particular by means of a single-wire data line). In addition, the control device is designed to interpret the received information depending on whether the vehicle module is in the operating mode or in the energy saving mode. In particular, the control device can be designed to assign the received information to the first sensor or to the basic sensor depending on whether the vehicle module is in the operating mode or in the energy saving mode. In particular, the information on the data line can be associated with the first sensor (and be interpreted in accordance with a transmission method with the first sensor) when the vehicle module is in the operating mode. Secondly, the information on the data line can be associated with the basic sensor (and be interpreted in accordance with the predefined information relating to the discrete states) when the vehicle module is in the energy saving mode. Therefore, a common data line can be used in an efficient manner for providing a basic function in the energy saving mode. In other words, a basic function can therefore be provided in an efficient manner.

A further aspect describes a vehicle (for example a passenger car, a heavy goods (commercial) vehicle or a motorcycle) which includes the vehicle module described in this document and/or the control device described in this document.

It should be noted that the methods, apparatuses and systems described in this document can be used both on their own and in combination with other methods, apparatuses and systems described in this document. Furthermore, any aspects of the methods, apparatuses and systems described in this document can be combined with one another in various ways.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
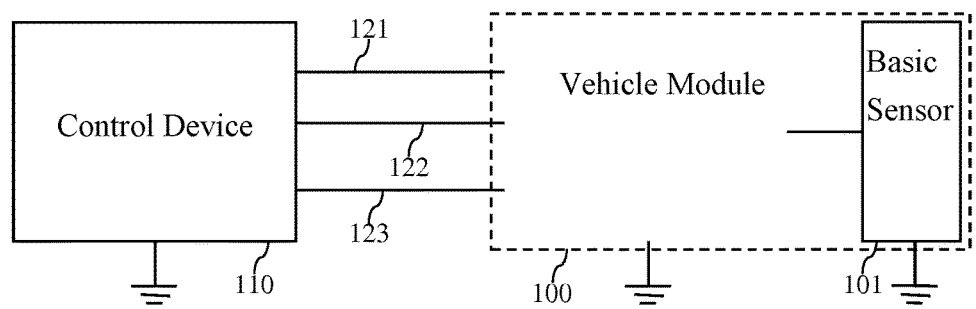
FIG. 1 is a block diagram of an exemplary vehicle module comprising a basic sensor for providing a basic function.

As outlined above, the present document concerns the efficient provision of one or more basic functions of a vehicle module in the event of an error and/or for realizing reduced energy consumption. In this context, FIG. 1 shows a vehicle module 100 which is connected to a control device 110 of the vehicle (for example to a central control device) by way of a supply line 121. The control device 110 can provide electrical energy, for operating the vehicle module 100, by way of the supply line 121. Furthermore, the vehicle module 100 is connected to the control device 110 by way of a data line 122. The vehicle module 100 and the control device 110 can interchange data, such as for example control data from the control device 110 to the vehicle module 100 for controlling the vehicle module 100 and/or sensor data from the vehicle module 100 to the control device 110, by way of the data line 122. The vehicle module 100 includes, for example, a door sensor which is designed to detect a hand of a user approaching the vehicle. The sensor data of the door sensor can be transmitted to the control device 110 by way of the data line 122.

The vehicle module 100 further has a basic sensor 110 which is designed to provide data for one or more basic functions even in the event of an error or even in an energy saving mode. An error occurs, in particular, when the vehicle module 100 is no longer supplied with electrical energy by the supply line 121. For this reason, the error can also be considered to be a situation with reduced energy consumption. In other words, the vehicle module 100 can be operated in an energy saving mode in which the vehicle module 100 is not provided with any electrical energy or only a reduced quantity of electrical energy. The basic sensor 101 can therefore be designed to provide data for the one or more basic functions without electrical energy from an energy supply of the vehicle (for example from a vehicle battery).

By way of example, the basic sensor 101 can include a switch (in this document also called the basic switch) which can be operated by a user of the vehicle. The basic switch can be designed, for example, to connect a basic sensor line 123 to ground. The operation of the basic switch can therefore be detected by means of the basic sensor line 123 (which can also be called the hardware line) in the control device 110, even when the vehicle module 100 is not supplied with electrical energy. The basic switch of the basic sensor 101 can be arranged, for example, on a door handle of the vehicle. Therefore, the operation of the door handle by a user of the vehicle can also be detected without operation of the door sensor of the vehicle module 100.

Providing data for a basic function according to FIG. 1 requires a basic sensor line 123. This leads to increased cabling in the vehicle and therefore to increased costs and weight. Furthermore, an additional basic sensor line 123 requires additional pins on the plug connectors and/or the processors of the control device 110 and of the vehicle module 100.

Figure 2A:
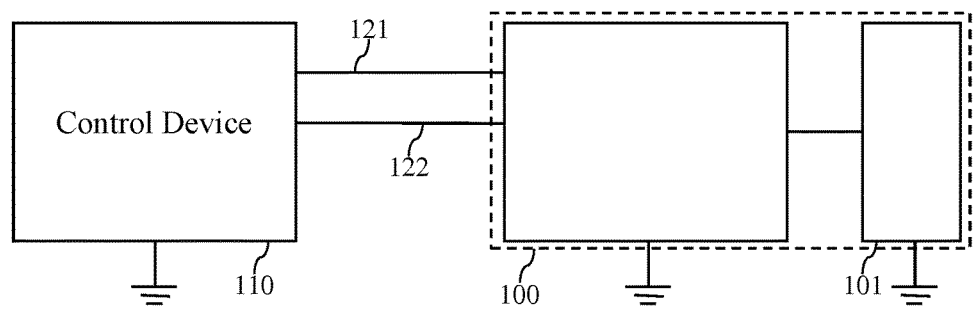
FIG. 2A is a block diagram of an exemplary vehicle module which is connected to a central control device in an efficient manner.

FIG. 2A shows an alternative arrangement for providing data for one or more basic functions by a basic sensor 101. In the arrangement illustrated in FIG. 2A, the function of a basic sensor line 123 is integrated into the data line 122. In particular, the data line 122 is used for transmitting information from the basic sensor 101 in the energy saving mode, for example when the energy supply by means of the supply line 121 is interrupted. Therefore, the data for the basic function can be provided without additional expenditure on cabling of the vehicle module 100.

Figure 2B:
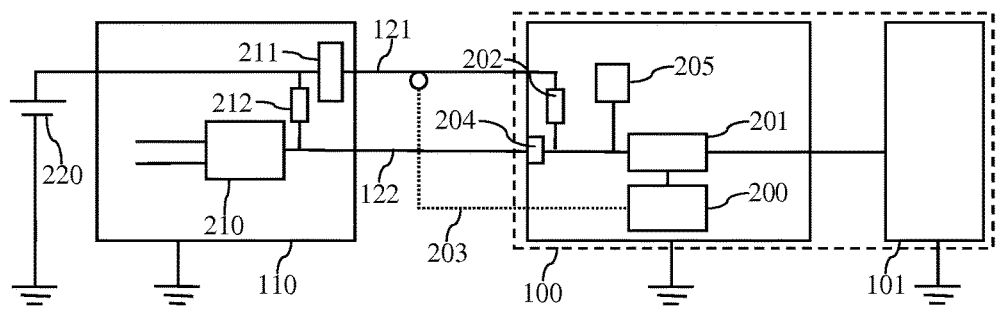
FIG. 2B is a block diagram showing further details of the vehicle module illustrated in FIG. 2A.

FIG. 2B shows an exemplary implementation of the arrangement illustrated in FIG. 2A of a vehicle module 100 comprising a basic sensor 101. The vehicle module 100 includes a first sensor 205 (for example the proximity sensor of a door handle) which is designed to record sensor data for providing a vehicle function and to provide said sensor data by means of the data line 122. The sensor data can be provided when the vehicle module 100 is in the operating mode (for example when the vehicle module 100 is supplied with electrical energy by means of the supply line 121). The vehicle module 100 can include an interface 204 for connection of the data line 122.

The basic sensor 101 can be used to provide data for a basic function of the vehicle function when the vehicle module 100 is in an energy saving mode (for example when the vehicle module 100 is not supplied with electrical energy by means of the supply line 121).

The basic sensor 101 can be connected to the data line 122 by way of an energy saving mode switch 201, in order to provide the data for a basic function. A control unit 200 of the vehicle module 100 can be designed to identify, by means of a line 203, when the vehicle module 100 is in the operating mode. In particular, it is possible to identify that energy is being supplied by the supply line 121. In this case, the control unit 200 of the vehicle module 100 can actuate the energy saving mode switch 201 in order to disconnect the basic sensor 101 from the data line 122. Secondly, the energy saving mode switch 201 can be designed in such a way that the energy saving mode switch 201 no longer disconnects the basic sensor 101 from the data line 122 in the energy saving mode when the energy supply by means of the supply line 121 has been interrupted.

By way of example, the energy saving mode switch 201 can be a transistor. The transistor can be normally on. In particular, the transistor can be designed to automatically move to the on state when the supply line 121 is interrupted, in order to connect the basic sensor 101 to the data line 122.

The control device 110 can comprise a communication unit 210. The communication unit 210 can be designed to interchange data (for example control data and/or sensor data) with the vehicle module 100 (in particular with the first sensor 205) by means of the data line 122 in the normal situation (that is to say in the operating mode). Furthermore, the communication unit 210 can be designed to determine a voltage level or a level on the data line 122 in the energy saving mode, in order to determine a state of the basic sensor 101 and in order to thereby provide data for a basic function of the vehicle function.

Furthermore, FIG. 2B shows an exemplary energy supply 220 (for example a vehicle battery) and a switch 211 in the control device 110, wherein the switch 211 can be opened when it is identified that the available energy in the energy supply 220 reaches or falls below a predefined threshold value. In particular, the switch 211 can be used to "disconnect" the vehicle module 100 when it is identified that a vehicle battery 220 has reached or fallen below a predefined state of charge. Therefore, the energy consumption by the vehicle (in particular at a low state of charge of the vehicle battery) can be reduced. As an alternative or in addition, the switch 211 can be used to "disconnect" the vehicle module 100 when it is identified that an energy saving function of the vehicle has been activated (for example by a user of the vehicle). Therefore, the energy consumption by the vehicle (in particular the quiescent current of a parked vehicle) can be reduced as required.

Furthermore, FIG. 2B shows exemplary pull-up resistors 202, 212 which can be used to raise the data line 122 to a predefined voltage level (for example to the voltage level of the energy supply 220).

As outlined above, a normally on transistor can be used for realizing the error mode switch 201 in the vehicle module 100. If there is no error or no reason for reduced energy consumption (that is to say in the operating mode), the gate of the transistor can be actuated by the control unit 200 of the vehicle module 100, so that the transistor remains off. The supply line (or the error line) 121 can be at a predefined voltage level of the supply voltage in this case (for example at 12 V). The data line 122 can be used for data interchange between the control device 110 and the vehicle module 100 (in particular the first sensor 205).

In the event of an error or in the energy saving mode, the voltage on the edge-controlled supply line 121 drops. In this case, the transistor of the error mode switch 201 is on. The potential of the upper contact (for example the source) of the transistor is pulled to the potential of the data line (for example 12 V) in this case. In the event of a change in the state of the basic sensor 101 (for example when the basic switch is closed), the potential of the data line 122 can be pulled to ground. This change in potential can be identified by the communication unit 210 in the central control device 110 (for example by means of a microcontroller of the control device 110). In particular, it is possible to identify that the energy saving mode is active (for example that the voltage level on the supply line 121 is at 0 V) and that a change in potential is taking place on the data line 122. The change in potential on the data line 122 can therefore be associated with a change in state of the basic sensor 101. Therefore, the data for providing the basic function of the vehicle function can be provided by means of the data line 122.

The vehicle module 100 can include different types of sensors, buttons and/or switches which still have to provide data for a basic function even when a data bus is switched off (that is to say in the event of an error). Examples include a mechanism for opening a vehicle door, a tailgate, a fuel filler flap, etc.

The arrangement illustrated in FIGS. 2A and 2B allows data for a basic function of a vehicle function to be provided without additional cabling. In particular, vehicle modules comprising basic sensors can be provided, and the costs and the weight are nevertheless kept low.

Furthermore, vehicle modules 100 of this kind comprising basic sensors 101 can allow a user of a vehicle to reduce the energy consumption by a vehicle as required. By way of example, it is possible for the user of a vehicle to activate an energy saving function of a vehicle by moving the one or more vehicle modules 100 comprising basic sensors 101 to the energy saving mode. The energy saving function can be activated, for example, when the vehicle is parked for a relatively long period of time (for example during a vacation). Owing to the activation of the energy saving function, it is possible to reduce the quiescent current of the vehicle and therefore the risk of a discharged vehicle battery can be reduced. Secondly, a basic function can continue to be provided by the basic sensors 101.

The present invention is not restricted to the exemplary embodiments shown. In particular, it should be noted that the description and the figures are merely intended to illustrate the principle of the proposed methods, apparatuses and systems.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle module for a vehicle, comprising:
   one or more sensors which are configured to record sensor data in an operating mode of the vehicle module and which are configured to adopt a large number of discrete states in an energy saving mode in order to provide a basic function of the vehicle module in the energy saving mode of the vehicle module;
   an interface for a data line for transmitting the sensor data to a control device of the vehicle; and
   an energy saving mode switch which is configured to connect the one or more sensors to the interface for the data line in the energy saving mode such that information relating to a state of the large number of discrete states is transmittable to the control device via the data line.

2. The vehicle module as claimed in claim 1, wherein
the one or more sensors comprise a first sensor which is configured to record the sensor data in the operating mode of the vehicle module;
the one or more sensors comprise a basic sensor which is configured to adopt the large number of discrete states in order to provide the basic function of the vehicle module in the energy saving mode of the vehicle module; and
the energy saving mode switch is configured to connect the basic sensor to the interface for the data line in the energy saving mode in order to transmit the information relating to the state of the basic sensor to the control device via the data line.

3. The vehicle module as claimed in claim 2, wherein
the basic sensor comprises a basic switch which is operable by a user of the vehicle;
the basic switch comprises an open state and a closed state;
the information relating to the open state comprises a voltage level of the data line, which voltage level is greater than or equal to a voltage threshold value; and
the information relating to the closed state comprises a voltage level of the data line, which voltage level is less than the voltage threshold value.

4. The vehicle module as claimed in claim 3,
wherein the basic switch is configured to couple the interface for the data line to a ground connection of the vehicle in the closed state.

5. The vehicle module as claimed in claim 2, wherein
the vehicle module comprises an interface for a supply line; and
the vehicle module is in the energy saving mode when a supply voltage at the interface for the supply line is less than or equal to a supply threshold value.

6. The vehicle module as claimed in claim 5, wherein
the energy saving mode switch is configured to automatically connect the basic sensor to the interface for the data line when the supply voltage at the interface for the supply line falls to or below the supply threshold value.

7. The vehicle module as claimed in claim 6, wherein
the vehicle module is configured to draw electrical energy for supplying the one or more sensors by way of the interface for the data line in the energy saving mode.

8. The vehicle module as claimed in claim 1, wherein
the energy saving mode switch comprises a transistor which has an on state and an off state; and
the transistor is configured to transition from the off state to the on state when the vehicle module transitions from the operating mode to the energy saving mode.

9. The vehicle module as claimed in claim 8, further comprising:
a control unit which is configured to keep the transistor in the off state when the vehicle module is in the operating mode.

10. The vehicle module as claimed in claim 1, wherein
the vehicle module comprises an interface for a supply line; and
the vehicle module is in the energy saving mode when a supply voltage at the interface for the supply line is less than or equal to a supply threshold value.

11. The vehicle module as claimed in claim 10, wherein
the vehicle module is configured to draw electrical energy for supplying the one or more sensors by way of the interface for the data line in the energy saving mode.

12. The vehicle module as claimed in claim 1, wherein
the one or more sensors comprise a large number of sensors;
all of the sensors of the large number of sensors are active in the operating mode; and
only some of the large number of sensors are active in the energy saving mode.

13. The vehicle module as claimed in claim 1, wherein
the first sensor comprises a sensor on a door handle of the vehicle, on a door of the vehicle, on a tailgate of the vehicle, and/or on a fuel filler flap of the vehicle.

14. The vehicle module as claimed in claim 1, wherein the data line is a single-wire data line.

15. The vehicle module as claimed in claim 1, wherein the data line is a local interconnect network bus.

16. A control device for a vehicle, wherein the control device is configured to execute processing to:
determine whether a vehicle module is in an operating mode or in an energy saving mode; wherein the vehicle module comprises one or more sensors which are configured to transmit sensor data by way of a data line in the operating mode, and to transmit discrete state information by way of the data line in the energy saving mode;
receive information from the vehicle module via the data line; and
interpret the received information depending on whether the vehicle module is in the operating mode or in the energy saving mode.

* * * * *